(12) United States Patent
Wang et al.

(10) Patent No.: US 7,710,049 B2
(45) Date of Patent: May 4, 2010

(54) DRIVER AND METHOD FOR DRIVING LEDS ON MULTIPLE BRANCH CIRCUITS

(75) Inventors: Zhao Wang, Beijing (CN); Hang Yin, Beijing (CN); Wenbo Tian, Beijing (CN)

(73) Assignee: Vimicro Corporation, Beijing (CN)

( * ) Notice: Subject to any disclaimer, the term of this patent is extended or adjusted under 35 U.S.C. 154(b) by 142 days.

(21) Appl. No.: 12/122,750

(22) Filed: May 19, 2008

(65) Prior Publication Data

US 2009/0167197 A1     Jul. 2, 2009

(30) Foreign Application Priority Data

Dec. 20, 2007    (CN)    ............... 2007 1 0303653

(51) Int. Cl.
H05B 37/02     (2006.01)
(52) U.S. Cl. ................................. 315/299; 315/307
(58) Field of Classification Search ............ 315/209 R, 315/210, 224–226, 246, 247, 250, 291, 295, 315/299, 307, 312
See application file for complete search history.

(56) References Cited

U.S. PATENT DOCUMENTS

2007/0273681 A1* 11/2007 Mayell ..................... 345/211
2008/0106216 A1* 5/2008 Yu et al. .................... 315/247
2009/0128045 A1* 5/2009 Szczeszynski et al. .. 315/185 R

* cited by examiner

Primary Examiner—Thuy Vinh Tran
(74) Attorney, Agent, or Firm—Wuxi Sino-US IP Agency, Ltd.; Joe Zheng

(57) ABSTRACT

Techniques pertaining to driving LEDs on multiple branches of a circuit are disclosed. According to one aspect of the present invention, an LED drive circuit includes a boost circuit configured for receiving an input voltage and providing an output voltage according to a control signal, a selector configured for alternatively selecting one of the feedback signals as an output feedback signal and switching on a corresponding branch circuit, and a pulse-width modulation (PWM) controller configured for generating a pulse-width modulation signal as the control signal for the boost circuit according to the output feedback signal of the selector, essentially to match respective currents in the multiple branches.

7 Claims, 6 Drawing Sheets

FIG. 1 *(prior art)*

DRIVER AND METHOD FOR DRIVING LEDS ON MULTIPLE BRANCH CIRCUITS

BACKGROUND OF THE INVENTION

1. Field of the Invention

The present invention is related to the area of\LED (light-emitting diode) illumination, more particularly, to techniques for driving LEDs on multiple branches of a circuit.

2. Description of Related Art

In a prior art system, an LED drive IC with inductor-based step-up topology can drive only LEDs on one branch circuit, where all LEDs are serially connected to maintain the same current flowing through. In this case, the current difference among all LEDs is zero and current matching between LEDs is perfect.

Nowadays, with display screen size increasing, more and more LEDs are needed to provide uniform backlight for a LCD screen. Some conventional drive ICs are developed to drive WLEDs (white light-emitting diode) on several branch circuits by neglecting the difference of the forward-bias voltage between WLEDs, as shown in FIG. 1. If all WLEDs have exactly the same forward-bias voltage with the same current, the current through each branch circuit will be matched. Unfortunately, it is not the case in reality. With 3~5 serially connected WLED in one branch, the total difference of voltage drop under a certain current will be big, sometimes up to 1V. It will lead to serious current mismatch between WLED branches if every branch is driven by the same voltage supply.

Some conventional design employs an internal current regulation loop to realize matching among LED branches as shown in FIG. 2. However, this current regulation circuit consumes additional power and leads to efficiency loss. To realize the matching, the difference of LED forward-bias voltage between two branches must be consumed on two NMOS field effect transistors MN1 or MN2. This power consumption will be transferred to heat. Sometimes this heat is so high and could cause IC reliability problems. Furthermore, this additional current regulation circuit introduces stability issues as well, needing much more design efforts.

Thus, improved techniques are needed for driving multiple branches of LEDs having matched currents going therethrough.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention is related to techniques for driving LEDs on multiple branches of a circuit. According to one aspect of the present invention, an LED drive circuit includes a boost circuit configured for receiving an input voltage and providing an output voltage according to a control signal, a selector configured for alternatively selecting one of the feedback signals as an output feedback signal and switching on the corresponding branch circuit, and a pulse-width modulation (PWM) controller configured for generating a pulse-width modulation signal as the control signal for the boost circuit according to the output feedback signal of the selector, essentially to match respective currents in the multiple branches.

The present invention may be used to drive LEDs used for illumination. Depending on implementation, the present invention may be implemented as a method, a circuit and a part of a system. According to one embodiment, the present invention is a method for driving LEDs on multiple branches of a circuit, the method comprises: generating an output voltage by regulating an input voltage according to a control signal; sampling a current in each branch of LEDs to produce a feedback signal; alternatively selecting one from the feedback signals of the multi-branches as an output feedback signal and switching on corresponding branch of LEDs; and generating a pulse-width modulation signal as the control signal according to the output feedback signal.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Embodiments of the present invention are discussed herein with reference to FIGS. 3-7. However, those skilled in the art will readily appreciate that the detailed description given herein with respect to these figures is for explanatory purposes only as the invention extends beyond these limited embodiments.

Figure 1:
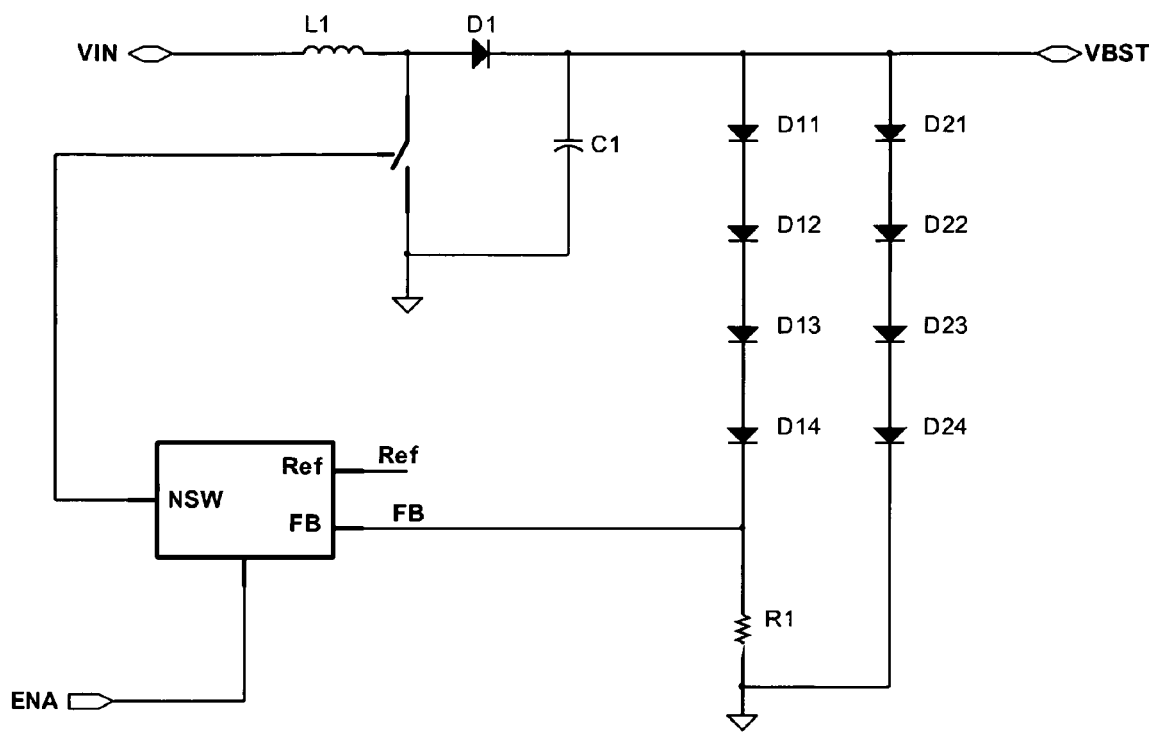
FIG. 1 is a block diagram showing one conventional LED drive circuit.
Figure 2:
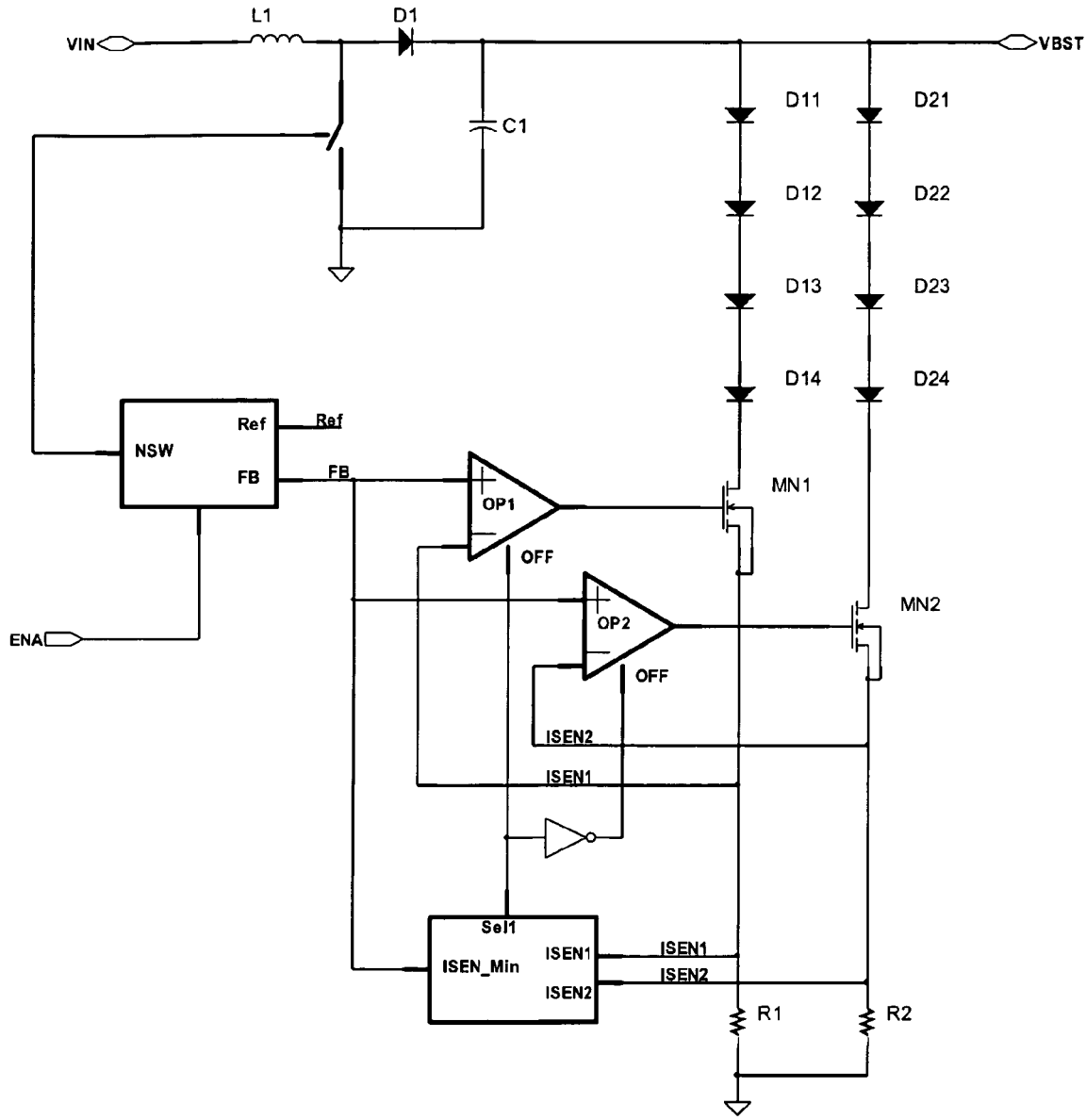
FIG. 2 is a block diagram showing another conventional LED drive circuit.
Figure 3:
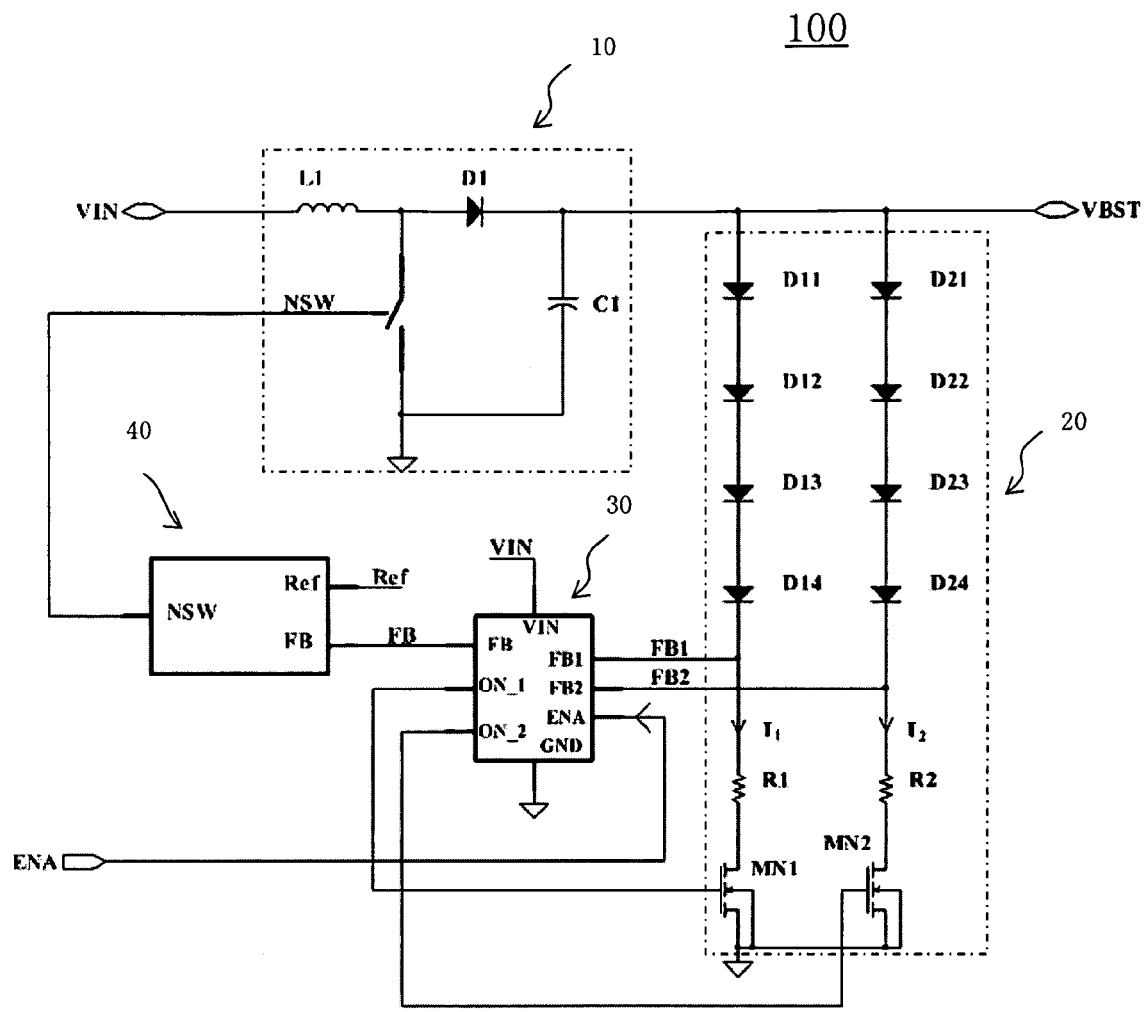
FIG. 3 is a block diagram showing a multi-branch LED drive circuit according to one embodiment of the present invention.

Referring to FIG. 3, there shows a diagram 100 in which a LED drive circuit is employed to drive LEDs on two branches 20 according to one embodiment of the present invention. The LED drive circuit comprises a boost circuit 10, a feedback signal selector 30 and a pulse-width modulation (PWM) controller 40 to drive a plurality of LEDs on multiple branches 20 (only two are shown as an example).

The boost circuit 10 is configured for receiving an input voltage VIN and providing an output voltage VBST according to a control signal from the PWM controller 40. Each of the LED branches is connected between the output voltage VBST and a ground reference and comprises a plurality of LEDs D11-D14 or D21-D24. A feedback resistor R1 or R2, and a branch switch MN1 or MN2 are connected in series. Each LED branch provides a feedback signal FB1 or FB2 representative of current $I_1$ or $I_2$ flowing therein via the feedback resistor R1 or R2. Each LED branch selectively turns on or off when a switch signal is applied on the branch switch MN1 or MN2. The feedback signal selector 30 is configured for alternatively selecting one from the two feedback signals FB1 and FB2 as an output feedback signal FB and providing a switch-on signal to the branch switch MN1 or MN2 of a corresponding branch simultaneously. The PWM controller 40 is configured for generating a PWM signal according to the output feedback signal FB of the feedback signal selector 30 and outputting the PWM signal as the control signal to the boost circuit 10.

In operation, the multi-branch LED drive circuit can regulate a current in each LED branch. To take the two branches as an example, at one time, the first branch is turned on and the second branch is off. The LED current $I_1$ in the first branch is accurately regulated to be Vref/R1. In another time, the first branch is turned off and the second branch is turned on. The current $I_2$ in the second branch is accurately regulated to be Vref/R2. The values of the feedback resistors R1 and R2 can be accurately matched using either on-chip resistors or external resistors. The matching between resistors can be easily controlled within 0.1%. Thus, the currents in the multi-branches are matched accurately.

The boost circuit 10 includes an inductor L1, a diode D1, a capacitor C1 and a boost switch. The inductor L1, the diode D1, the capacitor C1 are connected in series between the input voltage VIN and the ground reference, wherein a first terminal of the inductor L1 is coupled to the input voltage VIN, a positive terminal of the diode D1 is coupled to a second terminal of the inductor L1. The boost switch is connected between the second terminal of the inductor L1 and the ground reference and provided for selectively coupling the second terminal of the inductor L1 to the ground reference according to the control signal from the PWM controller 40. An intermediate node between the capacitor C1 and the diode D1 provide the output voltage VBST for the multi-branches of LEDs.

Figure 4:
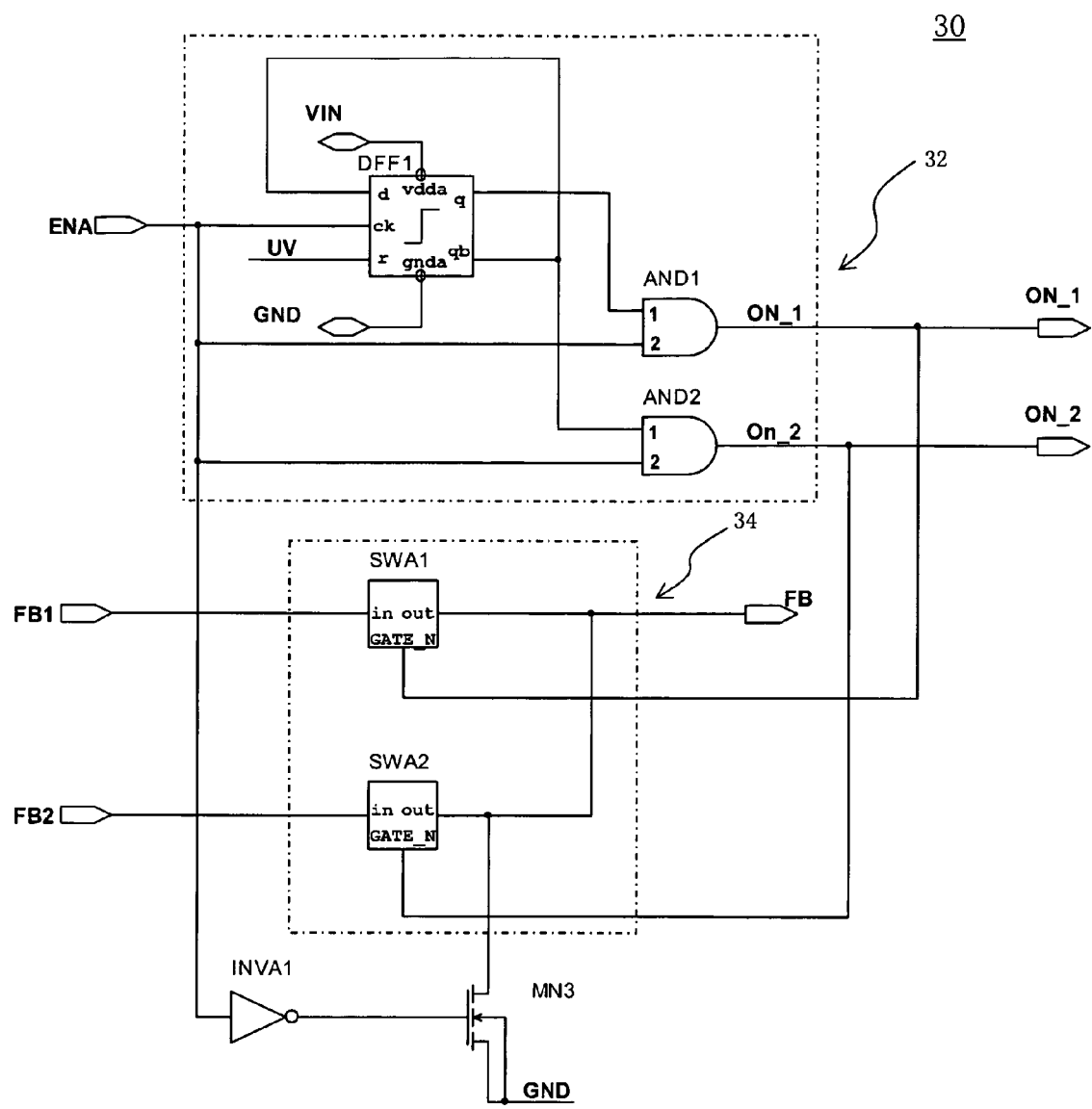
FIG. 4 is a circuit diagram showing a feedback signal selector of the multi-branch LED drive circuit shown in FIG. 3.

FIG. 4 shows a circuit diagram of the feedback signal selector 30 available for the multi-branch LED drive circuit according to one embodiment of the present invention. The feedback signal selector 30 comprises a first selecting unit 32 and a second selecting unit 34. The first selecting unit 32 generates a first switch signal ON_1 to the branch switch MN1 and a second switch signal ON_1 to the branch switch MN2 according to an enable signal ENA thereof so that the branch switches MN1 and MN2 are switched on alternatively. The second selecting unit 34 comprises a first transmission gate receiving the feedback signal FB1 and outputting the feedback signal FB1 when the first switch signal is on, a second transmission gate receiving the feedback signal FB2 and outputting the feedback signal FB2 when the second switch signal is on.

The first selecting unit 32 comprises a D trigger, a first AND gate AND1 and a second AND gate AND2. The D trigger has an input terminal d, an output terminal q, an inverted output terminal qb, a clock signal terminal ck, a reset terminal r. One input terminal of the first AND gate AND1 is coupled to the inverted output terminal qb and the input terminal d of the D trigger. One input terminal of the second AND gate AND2 is coupled to the output terminal q of the D trigger. The other terminal of the first AND gate AND1 is coupled to the enable signal ENA, the other terminal of the second AND gate AND2 is coupled to the enable signal ENA. The enable signal ENA is connected to the clock signal terminal ck. A UV signal is coupled to the reset terminal r. The first AND gate AND1 outputs the first switch signal ON_1 via an output terminal thereof, and the second AND gate AND2 outputs the second switch signal ON_1 via an output terminal thereof.

Figure 6:
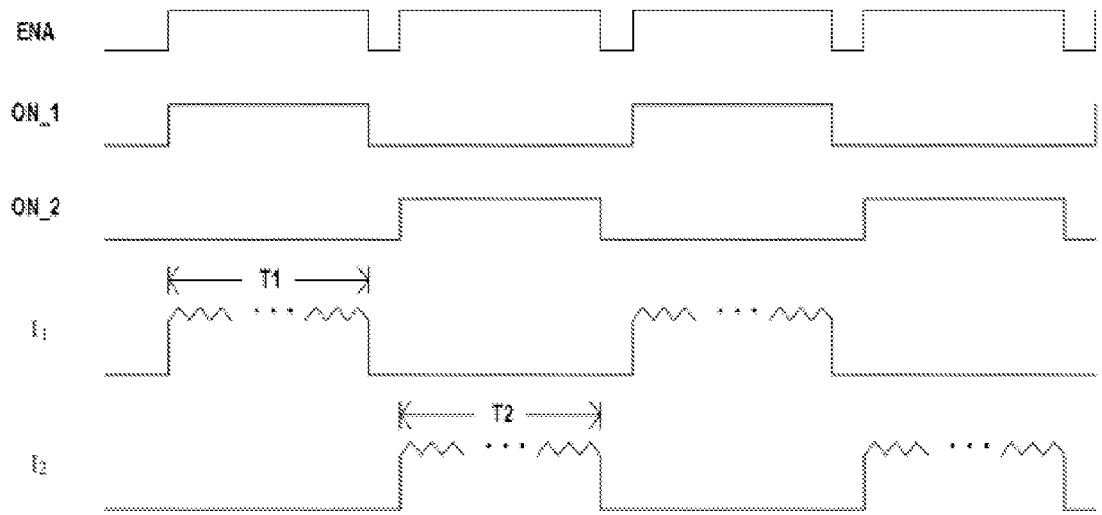
FIG. 6 is a timing diagram showing an operation of the feedback signal selector shown in FIG. 4.

FIG. 6 is a timing diagram showing an operation of the first selecting unit. When a rising edge of the enable signal ENA comes, the output terminal q of the D trigger outputs high level to the input terminal of the first AND gate AND1, the other input terminal of the first AND gate AND1 is high level, so the first AND gate AND1 output high level as the first switch signal ON_1, the inverted output terminal qb of the D trigger outputs low level to the input terminal of the second AND gate AND2, the other input terminal of the second AND gate AND2 is high level, so the second AND gate AND2 output low level as the second switch signal ON_2. When a fall edge of the enable signal ENA comes subsequently, the second AND gate AND2 output low level as the second switch signal ON_2, and the first AND gate AND1 output low level as the first switch signal ON_1. When a next rising edge of the enable signal comes, the output terminal q of the D trigger outputs low level, the inverted terminal qb of the D trigger outputs high level, so the second AND gate AND2 output high level as the second switch signal ON_2, and the first AND gate AND1 output low level as the first switch signal ON_1. Repeats the above operations, the feedback signal selector 30 can alternatively select one from the two feedback signals FB1 and FB2 as the output feedback signal FB and provide a switch-on signal to the branch switch MN1 or MN2 of corresponding branch simultaneously.

Figure 5:
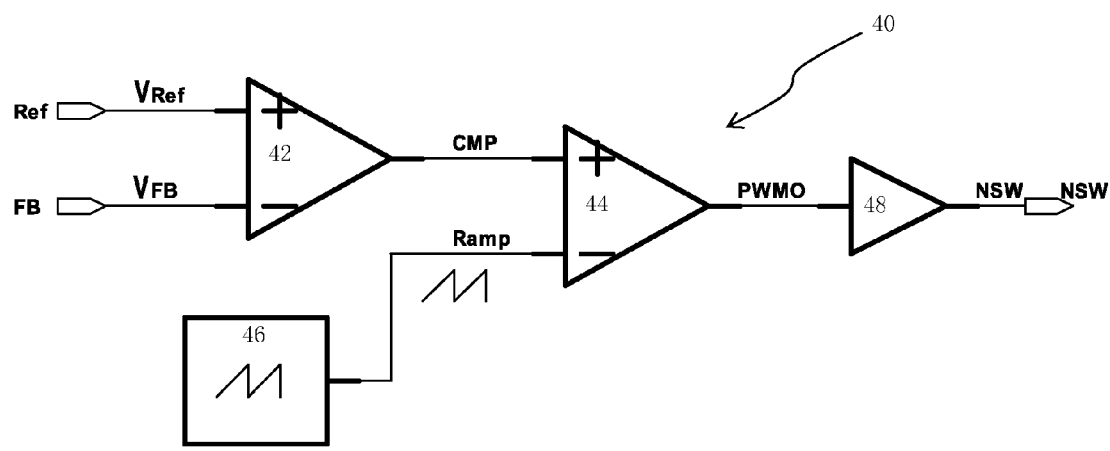
FIG. 5 is a circuit diagram showing a pulse-width modulation controller of the multi-branch LED drive circuit shown in FIG. 3.

FIG. 5 is a circuit diagram showing the PWM controller 40 of the multi-branch LED drive circuit. Referring to FIG. 5, the PWM controller 40 comprises an error amplifier 42, an oscillator 46, a PWM comparator 44 and a logic drive unit 48.

Figure 7A:
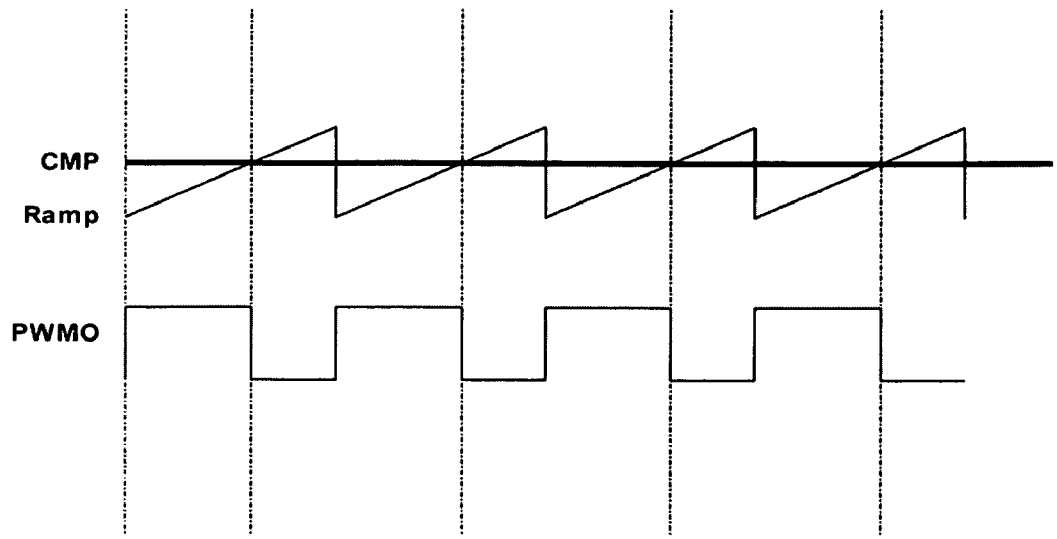
FIG. 7A and FIG. 7B are a timing diagram showing an operation of the pulse-width modulation controller shown in FIG. 5.
Figure 7B:
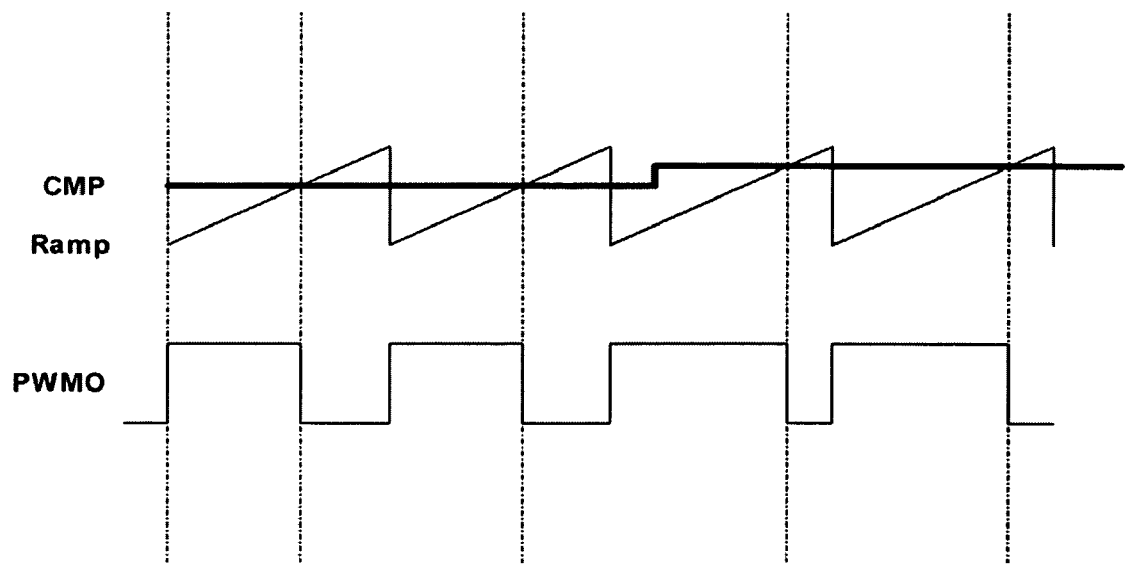

The oscillator 46 is used to generate a triangle wave signal. The triangle wave signal is coupled to a negative input of the PWM comparator 44. A negative input of the error amplifier 42 is coupled to the output of the feedback signal selector 30 for receiving the output feedback signal FB. A positive input of the error amplifier 42 is coupled to a reference port for receiving a reference voltage Vref. The error amplifier 42 is used to compare the feedback signal FB and the reference voltage Vref and amplify the difference and subsequently output the error signal CMP. The PWM comparator 44 is used to compare the triangle wave signal and the error signal CMP to generate a square wave signal PWMO with a certain duty cycle. Referring to FIG. 7A and FIG. 7B, when an electric potential of the triangle signal is higher than that of the error signal CMP, the PWM comparator 44 output a low level; otherwise, the PWM comparator 44 output a high level. The square wave signal PWMO is sent to the logic drive unit 48. The logic drive unit 48 drives the boost switch to turn on or off according to the square wave signal.

For the boost circuit shown in FIG. 3, the output voltage VBST and the input voltage satisfy the following equation.

$$VBST = \frac{1}{1-D} \cdot VIN \quad \text{equation 1}$$

D is the duty cycle of the square wave signal PWMO, wherein 0<D<1. So, if the duty cycle D is increased, it may cause the output voltage VBST increase. Then, the current of each LED branch increase to result the feedback signal FB1 or FB2 increase too. The negative feedback regulation continues until the electric potential of the feedback signal FB is equal to the reference voltage.

Thus, the regulated current $I_1$ of the first LED branch may satisfy the following equation.

$$I_1 = \frac{V_{FB1}}{R_1} = \frac{V_{Ref}}{R_1} \quad \text{equation 2}$$

Accordingly, the current $I_2$ of the second LED branch may satisfy the following equation.

$$I_2 = \frac{V_{FB2}}{R_2} = \frac{V_{Ref}}{R2} \quad \text{equation 3}$$

Thus, if R2=R1, the current $I_2$ of the second LED branch will equal to the current $I_1$ of the first LED branch accurately.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A LED drive circuit comprising:
   a boost circuit configured for receiving an input voltage and providing an output voltage according to a control signal;
   at least two branch circuits, each including a plurality of LEDs connected in series and providing a feedback signal representative of a current flowing therein, thus there are at least two feedback signals, each of the branch circuits further including a branch switch and a feedback resistor connected in series with the LEDs;
   a selector configured for alternatively selecting one of the feedback signals as an output feedback signal and switching on or off a corresponding one of the two branch circuits, the selector including a first selecting unit and a second selecting unit, wherein:
      the first selecting unit generates a switch signal for each of the two branch circuits so that branch switches of the two branch circuits are switched on alternatively; and
      the second selecting unit includes at least two transmission gates receiving the feedback signals of the corresponding branch circuits and outputting the output feedback signal of one of the branch circuits that is switched on; and
   a pulse-width modulation (PWM) controller configured for generating a pulse-width modulation signal as the control signal for the boost circuit according to the output feedback signal of the selector.

2. The LED drive circuit according to claim 1, wherein a voltage drop on the feedback resistor is used as the feedback signal of each of the branch circuits.

3. The LED drive circuit according to claim 1, wherein the boost circuit comprises an inductor, a diode, a capacitor and a boost switch, all connected between the input voltage and a ground reference, wherein a first terminal of the inductor is coupled to the input voltage, a positive terminal of the diode is coupled to a second terminal of the inductor;
   the boost switch is connected between the second terminal of the inductor and the ground reference and configured for selectively coupling the second terminal of the inductor to the ground reference according to the control signal from the pulse-width modulation controller;
   an intermediate node between the capacitor and the diode provides the output voltage.

4. The LED drive circuit according to claim 3, wherein the PWM controller comprises an error amplifier, an oscillator, a PWM comparator and a logic drive unit, and wherein
   the oscillator is used to generate a triangle wave signal;
   the error amplifier is used to compare the output feedback signal of the selector and a reference voltage and output an error signal;
   the PWM comparator is used to compare the triangle wave signal and the error signal to generate a square wave signal with a certain duty cycle; and
   the logic drive unit drives the boost switch to turn on or off according to the square wave signal.

5. The LED drive circuit according to claim 1, wherein the first selecting unit comprises a D trigger, a first AND gate and a second AND gate,
   the D trigger has an input terminal, an output terminal, an inverted output terminal, a clock signal terminal, a reset terminal;
   one input terminal of the first AND gate is coupled to the inverted output terminal and the input terminal of the D trigger, and one input terminal of the second AND gate is coupled to the output terminal of the D trigger;
   the other terminal of the first AND gate is coupled to an enable signal, the other terminal of the second AND gate is coupled to the enable signal;
   the enable signal is connected to the clock signal terminal;
   the first AND gate outputs a first switch signal, and the second AND gate outputs a second switch signal.

6. A method for driving multi-branches of LEDs, the method comprising:
   generating an output voltage by regulating an input voltage according to a control signal;
   sampling a current in each of branch circuits including the LEDs to produce a plurality of feedback signals;
   alternatively selecting one from the feedback signals as an output feedback signal and switching on a corresponding one of the branch circuits of LEDs by a selector, wherein the selector includes a first selecting unit and a second selecting unit:
      the first selecting unit generates a switch signal for each of the branch circuits so branch switches of the branch circuits are switched on alternatively; and
      the second selecting unit includes at least two transmission gates receiving the feedback signals of the corresponding branch circuits and outputting the output feedback signal of one of the branch circuits that is switched on; and
   generating a pulse-width modulation signal as the control signal according to the output feedback signal.

7. The method according to claim 6, wherein the generating of the pulse-width modulation signal as the control signal according to the output feedback signal comprises:
   generating a triangle wave signal;
   comparing the output feedback signal with a reference voltage to produce an error signal; and
   comparing the triangle wave signal and the error signal to generate a square wave signal with a certain duty cycle.

* * * * *